US009146657B2

(12) United States Patent
Beckett et al.

(10) Patent No.: US 9,146,657 B2
(45) Date of Patent: Sep. 29, 2015

(54) TEMPORAL GRAPH VISUALIZATION

(71) Applicant: Oracle International Corporation, Redwood Shores, CA (US)

(72) Inventors: Ken Beckett, Foothill Ranch, CA (US); Reza B'Far, Huntington Beach, CA (US); Ryan Golden, Austin, TX (US); Nigel King, San Mateo, CA (US); Kent Spaulding, Portland, OR (US); Todd A. Jackson, Irvine, CA (US)

(73) Assignee: Oracle International Corporation, Redwood Shores, CA (US)

( * ) Notice: Subject to any disclaimer, the term of this patent is extended or adjusted under 35 U.S.C. 154(b) by 187 days.

(21) Appl. No.: 14/033,327

(22) Filed: Sep. 20, 2013

(65) Prior Publication Data

US 2015/0089366 A1   Mar. 26, 2015

(51) Int. Cl.
*G06T 11/20* (2006.01)
*G06F 3/0484* (2013.01)
*G06F 3/0481* (2013.01)

(52) U.S. Cl.
CPC .......... *G06F 3/0484* (2013.01); *G06F 3/04817* (2013.01)

(58) Field of Classification Search
None
See application file for complete search history.

(56) References Cited

U.S. PATENT DOCUMENTS

| 8,527,879 | B2 * | 9/2013 | Symons et al. | 715/723 |
| 2013/0145269 | A1 * | 6/2013 | Latulipe et al. | 715/720 |
| 2014/0075380 | A1 * | 3/2014 | Milirud et al. | 715/810 |
| 2015/0089422 | A1 * | 3/2015 | Spaulding et al. | 715/771 |

OTHER PUBLICATIONS

Anchor Modeling; obtained at http://www.anchormodeling.com/?page_id=186; Sep. 20, 2013; 20 pages.

* cited by examiner

*Primary Examiner* — Phi Hoang
*Assistant Examiner* — Mohammad H Akhavannik
(74) *Attorney, Agent, or Firm* — Trellis IP Law Group, PC

(57) ABSTRACT

An embodiment provides a timeline upon which a playhead indicator is moved or positioned. Changes to a displayed graph that are within a predetermined interval of the playhead indicator's time position are shown graphically on or near the graph. Actor icons are positioned on or near the displayed graph. The actor icons correspond to different entities (e.g., a person, group, organization, software agent, etc.) that has made a change to the graph. Change indicators both on the timeline and in association with the actor icons can be color-coded to indicate addition, deletion, modification or other operations to graph items or to other objects being displayed.

20 Claims, 8 Drawing Sheets

TEMPORAL GRAPH VISUALIZATION

CROSS REFERENCES TO RELATED APPLICATIONS

This application is related to U.S. Patent Application Serial No. [TBD], entitled "COMPUTER USER INTERFACE INCLUDING LENS-BASED NAVIGATION OF GRAPHS," filed on Sep. 19, 2013, which is hereby incorporated by reference, as if it is set forth in full in this document for all purposes

BACKGROUND

Presentation and manipulation of data is a long-standing principal use of computing systems. Various different charts, graphs, or other approaches are used to present data to a human user. Such approaches are often referred to as "visualizations" of the data. For example, a popular visualization is a graph that includes nodes connected by lines or "edges." Such node-edge graphs can include a hierarchical tree structure where a root node is at the top, bottom, left or right of a display. Another type of node-edge graph is a circular graph where the root node may be in the middle of the display surrounded by successive children nodes in expanding concentric circles. Other variations of the node-edge graph are possible, as are many other types or varieties of visualizations.

It is often useful or important to view how a graph has changed over time. But navigating the graph through different time-periods can be problematic. In the cases where visualizations are large, or there may be more than one person, group, business organization, software agent or other "actor" manipulating and changing a graph it may be difficult to convey changes over time efficiently.

Many applications need to present large graphs to users for visual navigation. Presenting large graphs (hundreds of thousands of nodes, millions of edges) is challenging for several reasons. Generally only a small subset of nodes can be displayed, the graphs are difficult to lay out in a manner that makes them easy to navigate, and the visual representation of the nodes can be challenging. Finally, some applications are interested not just in the graph as it exists today, but need to show how it changed over time. Visualization operations can be much more difficult when the application is a web application working with large graphs.

Many graph visualization tools use a physics engine or a simplified variant that uses a small set of forces to make nodes separate (and animate) on the display. These calculations run repeatedly over all the nodes in the graph, resulting in automatic layouts. Nodes seem to move into place. This is problematic as graphs become very large, the animation slows down and takes too long as the number of nodes increases. Many other graph engines calculate a static layout and then display the graph based on that layout. Static layout tools generally result in static displays.

SUMMARY

An embodiment provides a timeline upon which a playhead indicator is moved or positioned. Changes to a displayed graph that are within a predetermined interval of the playhead indicator's time position are shown graphically on or near the graph. Actor icons are positioned on or near the displayed graph. The actor icons correspond to different entities (e.g., a person, group, organization, software agent, etc.) that has made a change to the graph. Change indicators both on the timeline and in association with the actor icons can be color-coded to indicate addition, deletion, modification or other operations to graph items or to other objects being displayed.

One embodiment provides a method for analyzing operations performed on a graph over time, the method comprising: displaying the graph; displaying a timeline; obtaining data indicating multiple operations made to the graph, wherein the data further includes corresponding timestamps at which each operation occurred; showing one or more of the operations on the timeline at the time indicated by the corresponding timestamps; accepting a signal from a user input device to allow a user to position a playhead indicator at a particular time on the timeline; determining which operations have timestamps that are within a predetermined interval of the playhead indicator's particular time position; and illustrating the determined operations in the display of the graph.

A further understanding of the nature and the advantages of particular embodiments disclosed herein may be realized by reference of the remaining portions of the specification and the attached drawings.

DETAILED DESCRIPTION OF EMBODIMENTS

Figure 1:
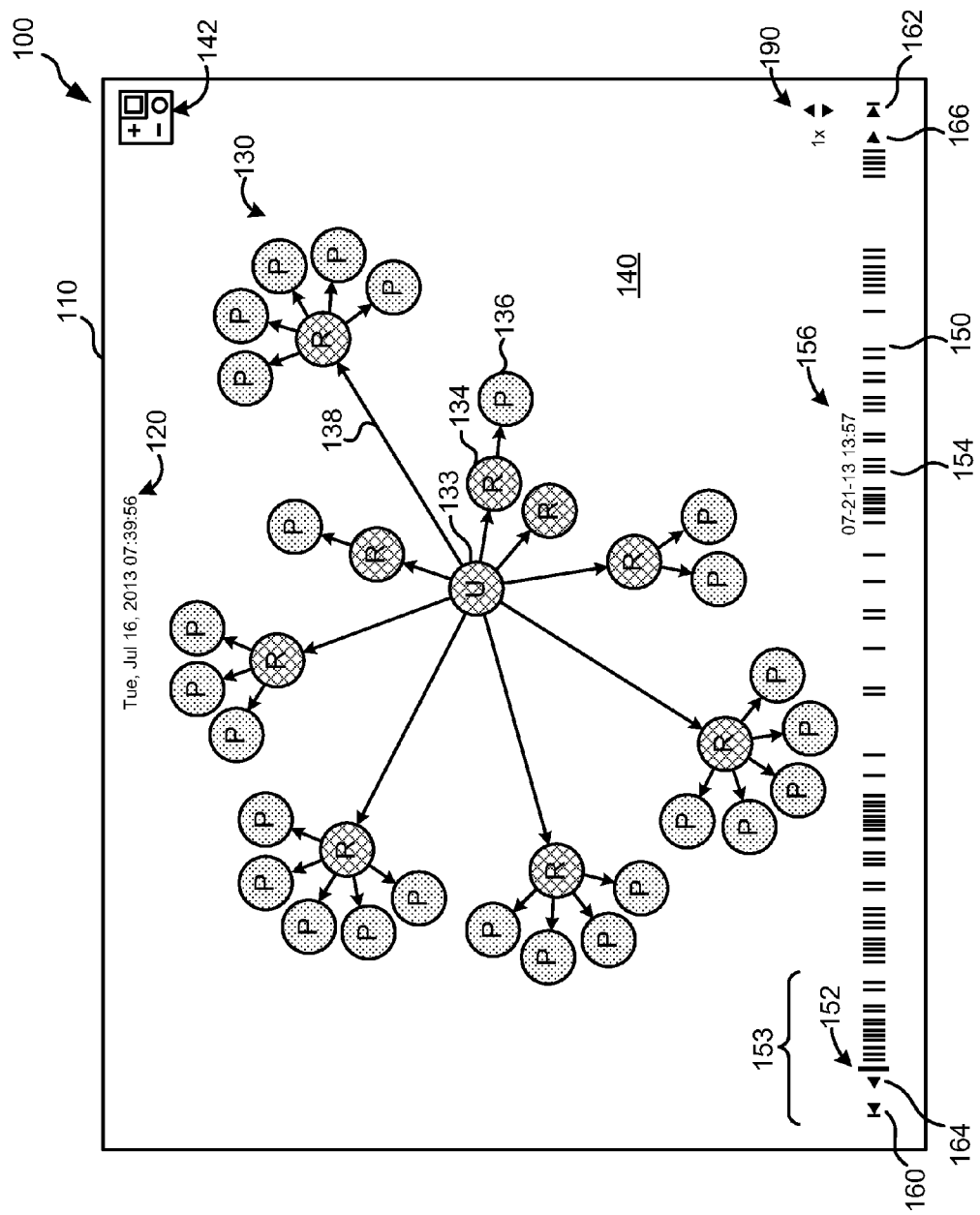
FIG. 1 shows an example of a temporal graph user interface in accordance with an embodiment of the invention.

FIG. 1 shows an example of a temporal graph user interface in accordance with an embodiment of the invention. Although particular details are described, other embodiments may include more or less of the features shown. Features may be changed from those shown in the Figures and examples without departing from the scope of the invention as determined by the claims.

In FIG. 1, graphical user interface 100 is shown in window 110. Typically, the user interface will be displayed on a display screen such as a computer monitor. However, any other suitable type of display may be used such as projected, three dimensional, holographic, virtual reality, etc., types of displays. In general, the hardware employed to implement the features described herein is not critical and any suitable computing architectures, displays and user input devices can be used. Window 110 can be generated and controlled by an application program, operating system, web browser, etc.

Graph 130 is shown within the display area 140 of window 110. In this example, the graph is a circular node-edge graph having nodes such as 132, 134 and 136 interconnected by edges such as 138. Also shown in display area 140 are controls and indicators such as current time at 120. Zooming and display controls at 142 include zoom in and zoom out buttons marked with plus and minus symbols, respectively. Also included are a centering button which is marked with a highlighted square, and a lens activation button that is marked with a circle. In a particular embodiment, details of the lens view that is initiated with the lens button are described in the co-pending related patent application that is cited above.

Timeline 150 is shown along the bottom of display area 140. Timeline 150 includes playhead indicator 152 that is slightly taller than the height of the timeline, itself. On the timeline are various operation markers shown as vertical lines. In a particular embodiment, the operation markers are given different colors that correspond with the type of operation to which they correspond.

The playhead indicator can be moved about on the timeline by the user in several different ways. For example, the user may point and click with a mouse, trackpad, touch screen or other method to indicate a position on the timeline. In this example, a mouse is used to move pointer 154 to a point on the timeline. When a left mouse button is clicked, the playhead indicator jumps to the pointer position. The time at which the pointer is positioned is shown above the pointer position by a timeline time display at 156.

The playhead indicator can also be moved along the timeline by using transport controls such as 160, 162, 164 and 166. These controls can be used to jump the playhead indicator to the beginning of the timeline (button 160) or to the end of the timeline (button 162). Or to start the playhead indicator moving, or playing back automatically, either in the reverse (button 164) or forward (button 166) directions. The speed at which playback occurs can be adjusted by the playback speed control at 190. In the example of FIG. 1, the playback speed is set to normal, or 1x, speed.

Figure 2:
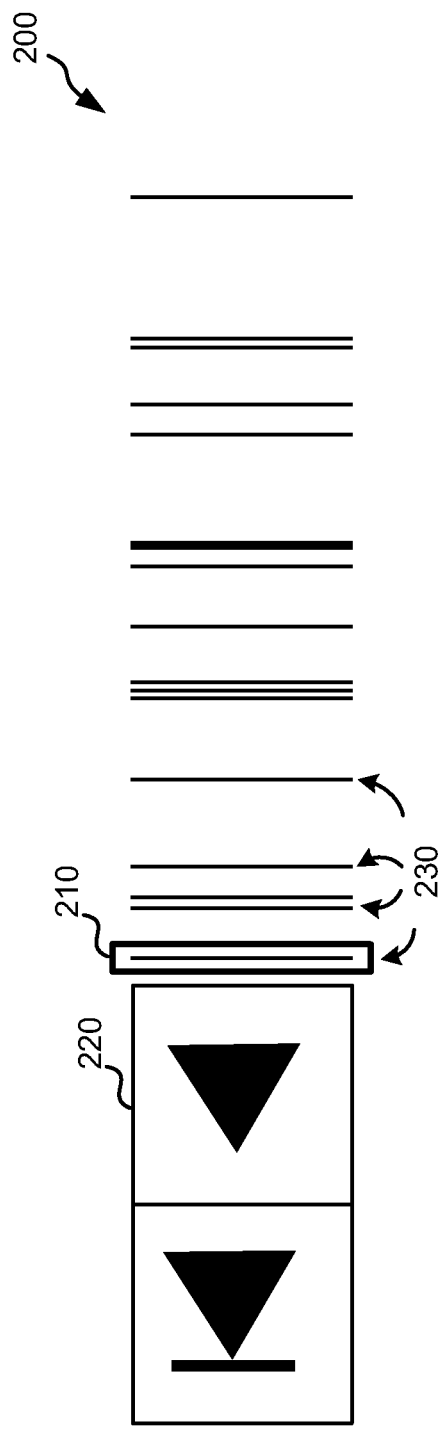
FIG. 2 shows an enlarged portion of the timeline of FIG. 1.

FIG. 2 shows an enlarged portion of the timeline of FIG. 1. In FIG. 2, timeline portion 200 shows an enlargement of the timeline portion 153 of FIG. 1. Playhead indicator 210 has moved slightly from its beginning position at the start of the timeline at 220. Operation markers are shown at, for example, positions 230. One operation marker is within the window of playhead indicator 210. In an embodiment, the size of the playhead indicator window determines the visible time range for the display. The playhead indicator size and window size may be adjusted by the user or automatically by visualization software or other software or hardware. As playhead indicator 210 moves along the timeline to the right (assuming forward automatic playback button 166 in FIG. 1 has been pressed), the event or operation markers that come within the playhead indicator's window area are used to trigger animations of the operation in display area 140 of FIG. 1.

Figure 3:
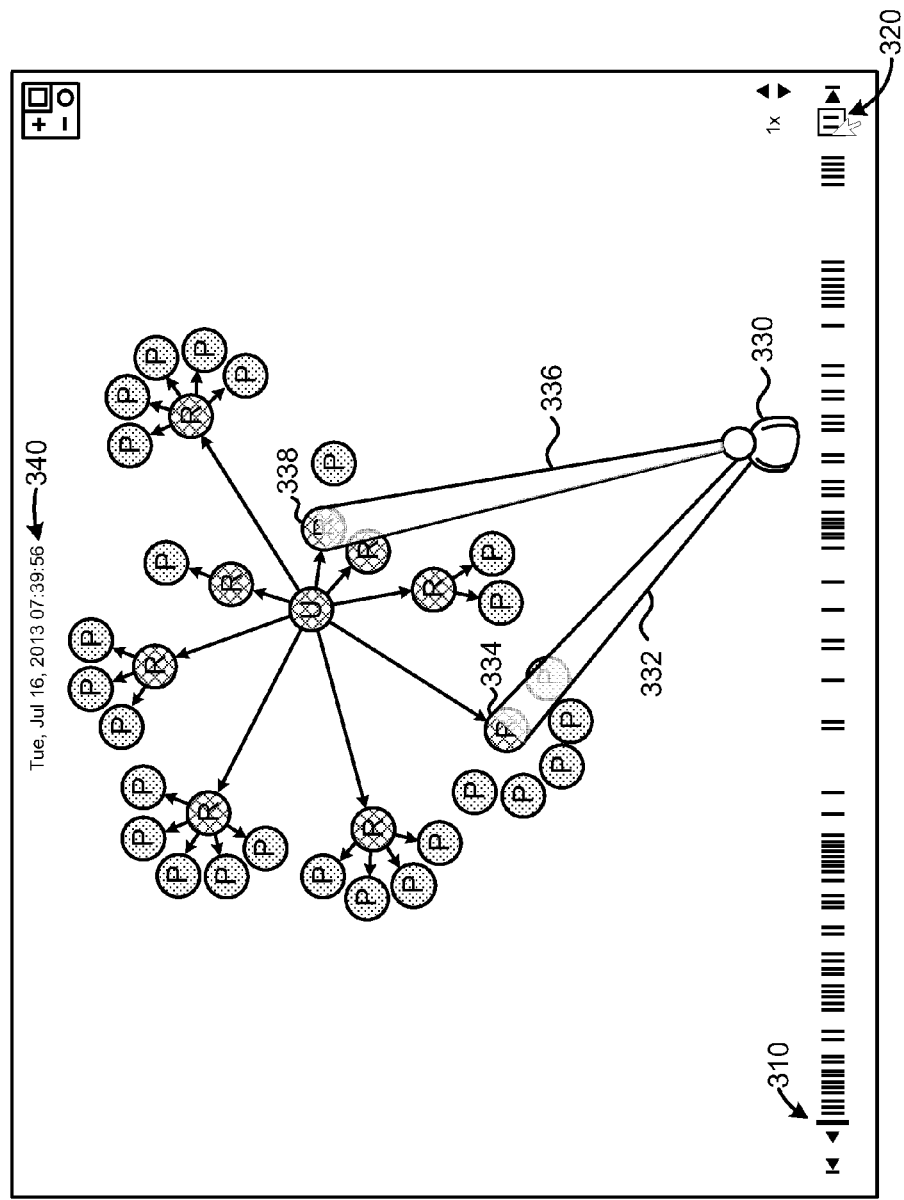
FIG. 3 shows an example of an operation being illustrated in the display area.

FIG. 3 shows an example of an operation being illustrated in the display area. In FIG. 3, playhead indicator 310 has begun moving to the right to play back the change history for the graph being viewed. Playback in this case is a result of the user clicking on a forward play button at 320 which has, as a result, changed into a pause button so that pressing the same button area again will cause the playback to pause and the forward play symbol to again be displayed on the button.

As the playhead indicator moves over an operation marker the data corresponding to the underlying marker is used to generate or render an accompanying animation or graphic. In a particular embodiment, an operation is defined by type (e.g., add, delete, modify); object (e.g., node, edge, position, or a combination of these); actor (e.g., person, group, software agent, business organization or other entity); and a time of occurrence or "timestamp." In FIG. 3, there are two events currently being played back in the display area. These are shown as "action beams" 332 and 336 emanating from actor icon 330 to the objects that are affected by the beams—namely nodes 334 and 338, respectively. In this example, the actor is a person who has made changes to nodes 334 and 338 at around the time "Tue, Jul. 16, 2013 07:39:56" as shown by the playback time at 340. The beams emanate from the actor icon to the object that was affected. In a particular embodiment, color coding is used for operation markers and for action beams. Red indicates a deletion or removal of an object, green is for an addition, yellow is for a modification or change. In this case since the actor has made changes to nodes 334 and 338 the interiors of action beams 334 and 338 are colored yellow.

Since these two operations of modifying nodes 334 and 338 have occurred very closely, or simultaneously, in time at the current playback resolution, the two change events appear together on in the display area. In a particular embodiment, actor icon 330 appears just before the first change event. Next the change to node 334 is indicated by a fading in of action beam 332. Change events can be made to occur over a predetermined, default, or specified duration in order that the user will not miss the animation if it is too short. In other words, the actual time that was taken by the actor to make the change is not necessarily determinative of the duration of the operation animation during playback of the history. Once the action beam has been faded in to full saturation, it can be held for a half-second before being faded out. The times for fading in, out, and holding any specific graphic can vary, as desired.

In a particular embodiment, the actor icon is labeled with the name of the actor, such as a person's name. The name is shown under the icon but can appear overlayed onto the icon, or not at all. Other information may be displayed in association with an actor icon either on or near the actor icon. The actor icon also moves slowly about on the display, such as by sliding horizontally as playback of the graph history proceeds. The action beams are maintained emanating from their associated actor icon to the affected object. The animation may make it appear that the beams are "stretching" or "sweeping" while maintaining their anchor points at the actor icon and target object. This movement of the actor icons can assist the user in differentiating the actor icons apart when there are many such actor icons on the screen or when the actor icons, beams and objects begin to overlap with each other or with parts of the graph out of necessity because of limited space within the display area. In a particular embodiment, the graph items can also move around as they are edited, and animations are used to show changes such as new nodes growing out of the graph; or deleted nodes or subtrees shrinking and simultaneously pulling up into a parent node in a smooth animation. Modifications to graph items can also be highlighted, such as by displaying a halo color around the item. By using one or more of these animation and display techniques, areas of change for given time periods can be detected by a human viewer as the change history of the graph is played back in the manner described herein. Also, the viewer can get an idea of the magnitude, frequency or density of changes by playing back the history at different speeds. The viewer can also obtain other visual cues about the change history of the graph that can aid in analysis of the graph and the information that the graph represents.

Figure 4:
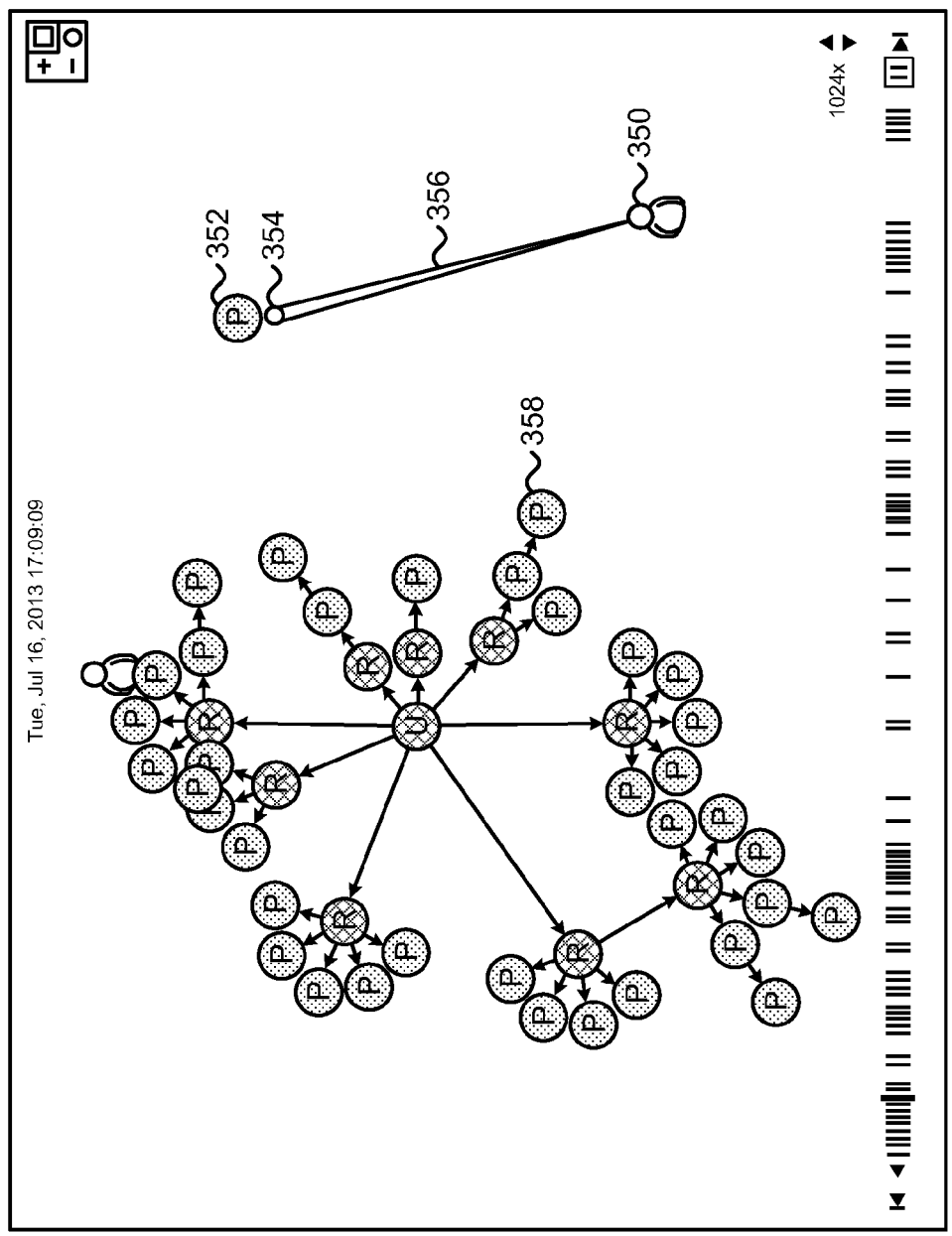
FIG. 4 illustrates an event animation for creation of nodes.

FIG. 4 illustrates an event animation of an "add" or creation of nodes. In FIG. 4, actor icon 350 has an action beam 356 from actor icon 350 toward new nodes 352 and 354. Node 352 has been created first and is shown at full size at the present time in the playback. Node 354 is shown "growing" from or "arising out of" node 352. This type of animation acts as a visual cue for the user or viewer and visually establishes that a node is being created. The action beam is shown in blue and there is a blue highlighting boundary around the new nodes as they are being formed. In other embodiments, other animations can be used.

Figure 5:
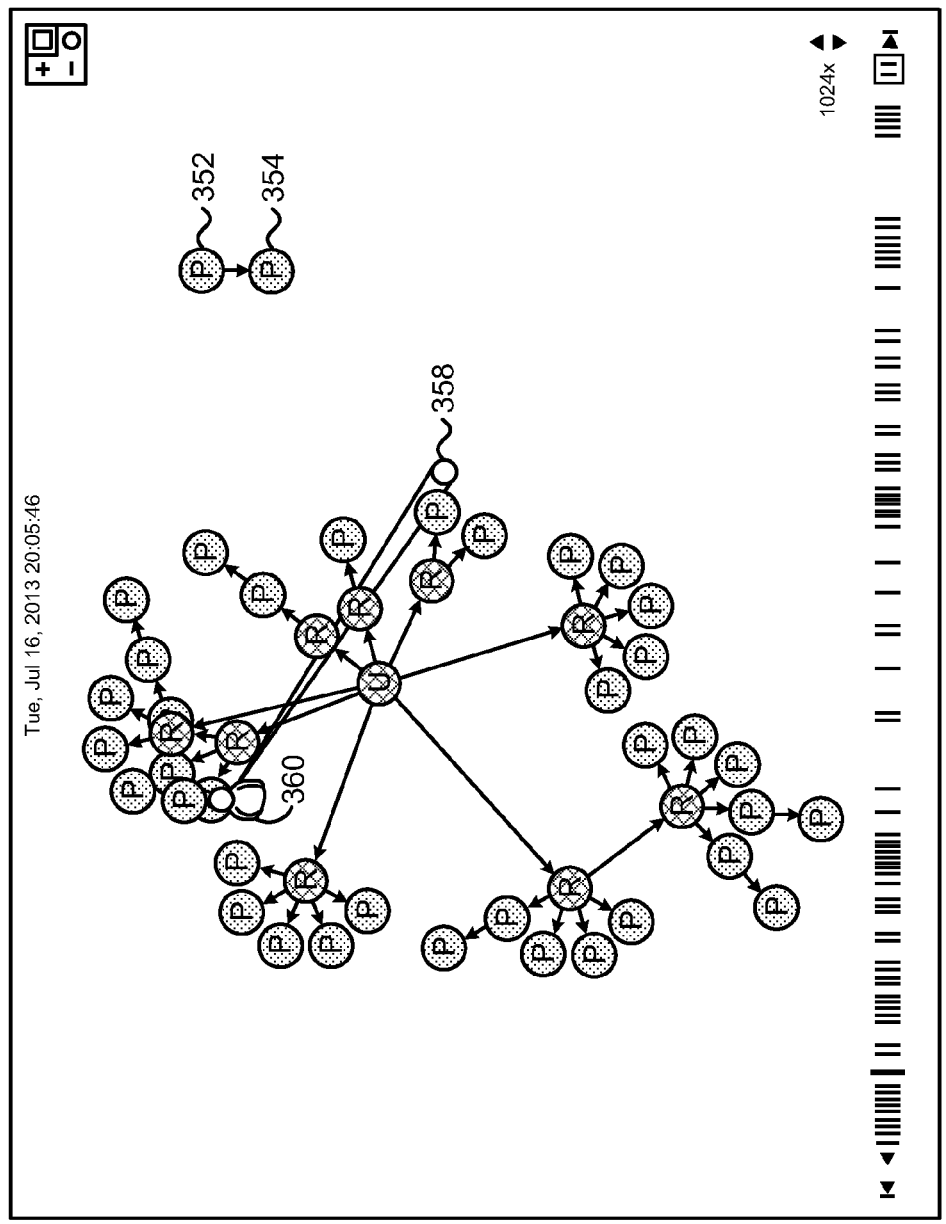
FIG. 5 shows the graph display area of FIG. 4 after nodes have been created.

FIG. 5 shows the graph display area of FIG. 4 after nodes 352 and 354 have been created. At this point in the playback another actor icon 360 is shown performing a "delete node" operation on node 358 of FIG. 4. Similar to the node creation animation in reverse, node 358 shrinks in size and is eventually removed from the graph display. The action beam from actor icon 360 to node 358 is red.

Figure 6:
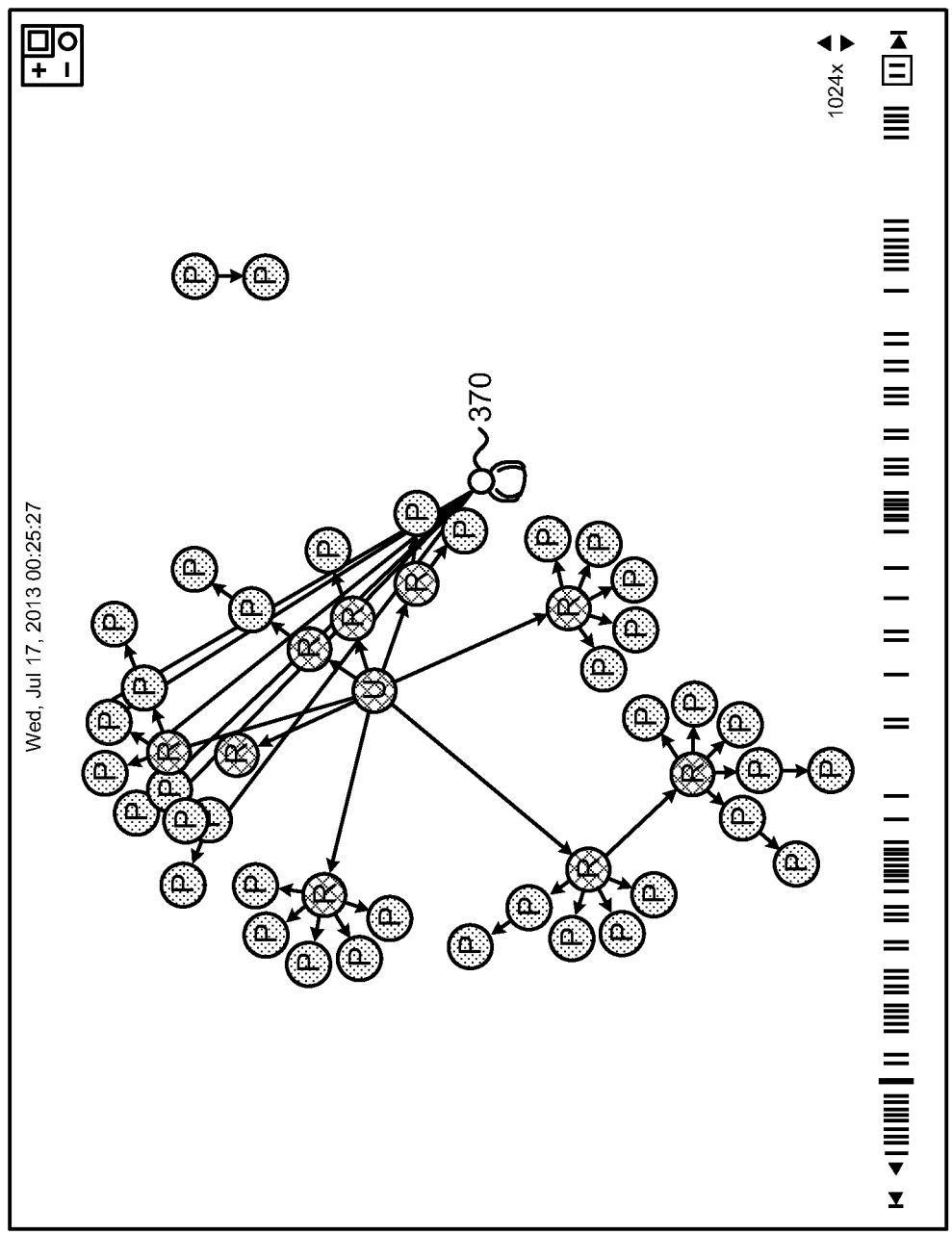
FIG. 6 shows the graph display slightly further along in playback from the display of FIG. 5.

FIG. 6 shows the graph display slightly further along in playback from the display of FIG. 5. In FIG. 6, a new actor icon 370 is shown performing multiple operations on different graph items. Beams emanating from actor icon 370 show node creation (green or blue), deletion (red), and modification (yellow) in progress.

Figure 7:
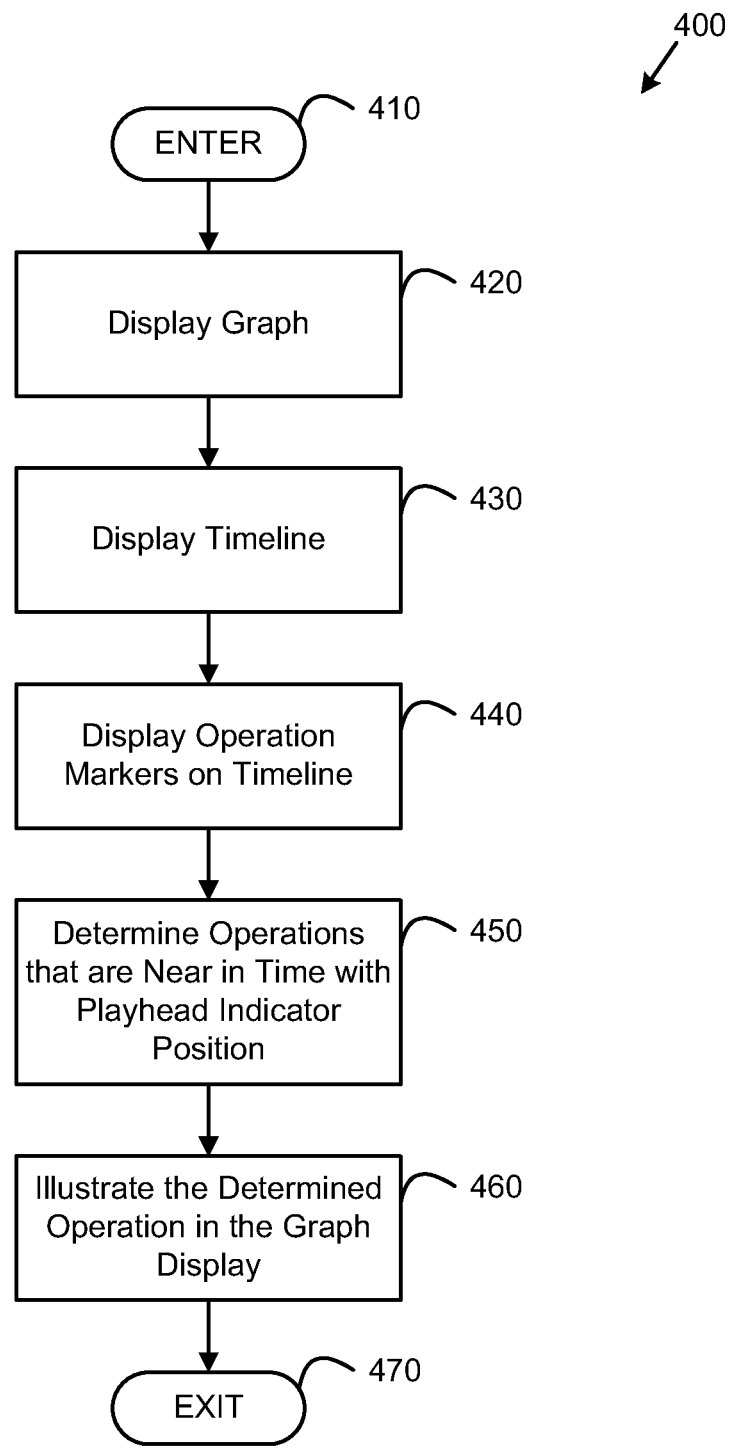
FIG. 7 shows a flowchart that illustrates basic steps in a method to implement a temporal display according to an embodiment.

FIG. 7 shows a flowchart that illustrates basic steps in a method to implement a temporal display according to an embodiment. In FIG. 7, flowchart 400 is entered at step 410 when it is desired to generate or update a graph display to analyze past changes made to the graph over time.

At step 420 a graph or other visualization, or portion thereof, is displayed. At step 430 a timeline is displayed. At step 440 operation markers are displayed on the timeline. Note that the order of execution of steps can be changed unless otherwise indicated. Although particular arrangements and styles of graphic items have been depicted in the examples provided herein, other arrangements and styles are possible. For example, the timeline need not be horizontal at the bottom of the display. The timeline may be vertical, circular, three-dimensional, etc. The timeline need not be linear as, for example, where markers may be arranged to advance toward or away from the viewer in three-dimensional space. Other arrangements are possible. Operation markers need not be mere lines but can be different shapes, as desired.

At step 450 a determination is made of the operations that are within a predetermined interval of the current playhead indicator position. This determination may be made based on a timestamp that is associated with each operation marker. At step 460 the operations that are within the predetermined interval of the current playhead indicator position are illustrated on or near the graph display.

It should be apparent that the flowchart of FIG. 7 is merely a basic example to show broad acts that can be performed to implement some of the functionality described herein. In different embodiments, steps may be added to, removed from, or modified from those shown in FIG. 7. The acts or steps may be performed by any one or more processors that can be in the same or different geographical locations and acting at the same time, or at different times, as desired. Any suitable programming techniques and/or computing architectures may be used.

In an embodiment, graph layout methods implemented in software and/or hardware can be used to represent a radial graph of objects while allowing for arbitrary panning and zooming by a human user. Layout methods are can be assigned to an entire graph, or to subgraphs within the graph. Different layout methods can be applied to different groups of nodes. Nodes can be moved among different node groups where the different node groups may be displayed with different layout methods.

A radial layout method allows scaling to very large graphs and can support graphs with many roots and disconnected components. By mixing static layout plans and force layouts, graph displays can be optimized for better comprehension for users. Additional features provide visual grouping of nodes with ordered lists of attributes/counts; auto-pan zoom feature; ability to drag and drop nodes from one parent to another; Groups of related nodes (siblings) can be selected and dragged from one parent to another. Smooth animations are used to provide visual cues for operations such as add/delete nodes, expand/collapse subtrees, etc.

One embodiment pre-plans the graph layout so each node in the viewable area already has an idea of where to move to. This is similar to static layout calculations and can allow calculations to occur in the browser or in the server. This can optimize the rendering speed according to resources available at the client side or server side, and according to network bandwidth available between the server and client systems. This approach can also allow an initial layout pass and layout passes of partitions independently of one another, in parallel if needed. Limited force (object "physics") interactions can be used that provide some animation and further auto-layout.

For temporal display layout, operations performed by the user on the graph can be tracked. In an embodiment, each operation is a tuple of {operation type, data_tuple, actor, time}. The operation can be add, delete, modify, move, etc. The data_tuple can specify an edge, a node, position, or a combination. Time can be logical or based on timestamps on a clock. The term, "timestamp" is used in this document to include any manner of indicating a time. Operations can be ordered in time as a total order, or a partial order (e.g. using happened-before and a logical clock). Actor identifies a person, group, business, organization, software agent or other entity that performed an operation or otherwise made a change to the graph (also referred to as a "change event). In an embodiment, display of temporal changes over time uses a total order of operations so the graph history changes can be shown in both directions of time, and deterministically. In the case of concurrent operations, an ordering can be chosen and stored in association with an operation (e.g. as a sequence number appended to the time).

Caching of layout plans can be used to improve performance. In an embodiment, a configurable number of layouts are pre-programmed both backwards and forwards in time so animations through time can be smoother. This planning can happen in the server or browser and can be cached and pre-fetched as needed.

The visual representation (e.g., graphics, highlights, animation, etc.) of areas that underwent changes further assists finding areas of interest. Constraining the time-period of interest can allow for further improvements in navigational speed. Use of one or more of the features herein can allow very large scale graph representations (for any arbitrary graph) to be navigated in web applications.

An embodiment includes a graph representation, a layout-algorithm manager, and layout-algorithms. The graph may be represented in any suitable form, e.g. an adjacency matrix, adjacency list, or objects comprised of nodes with links to parents and children, etc. The Layout Manager arranges the nodes of a graph in a coordinate space, for example, on an HTML5 canvas. For the layout, each node can have a shape and size. Preferably, nodes should not intersect on the layout. The intersection of lines on the canvas is attempted to be minimized. The graph is laid out in a radial manner, with nodes arranged radially around their parent(s).

A gesture or keystroke can impose a change in magnification level. At different levels, nodes may change appearance. For example, morphing from a circle representing the node to a dialog box asking for input, or a table providing details about the data in the node.

A Layout Manager manages a set of layout-algorithms, with each one associated a disjoint set of nodes of the larger graph and a potentially intersecting set of edges. A layout-algorithm uses the basic principles to create a layout that can account for graphs with any number of root nodes, trees, Directed Acyclic Graphs (DAGs), cycles, and so on. Table I, below, lists the basic principles, any one or more of which may be used in an exemplary layout procedure for all or a portion of a graph:

================= BEGIN TABLE I =====================
1. Sizes of nodes and subgraphs are determined recursively, in a bottom-up fashion while also determining distances and angles from parent nodes.
2. Appropriate distances and angles of nodes and subgraphs from parent nodes are determined that provide a balanced and visually appealing layout, while optionally retaining the order of sibling nodes.
3. The angles of subgraphs around a parent node are clustered to be visually appealing, generally opposite the grandparent node. Subgraphs of a root node are generally spaced evenly around it. Optionally, subgraphs can be laid out in a particular direction such as down or right to create more of a hierarchical layout.
4. Special logic is used during the layout process so that any cycles in the graphs are handled properly without causing endless loops.
5. Separate graphs (separate root nodes) are laid out in a manner that keeps them visually separate while minimizing empty space.
---------------------------- END TABLE I -----------------------------------

Figure 8:
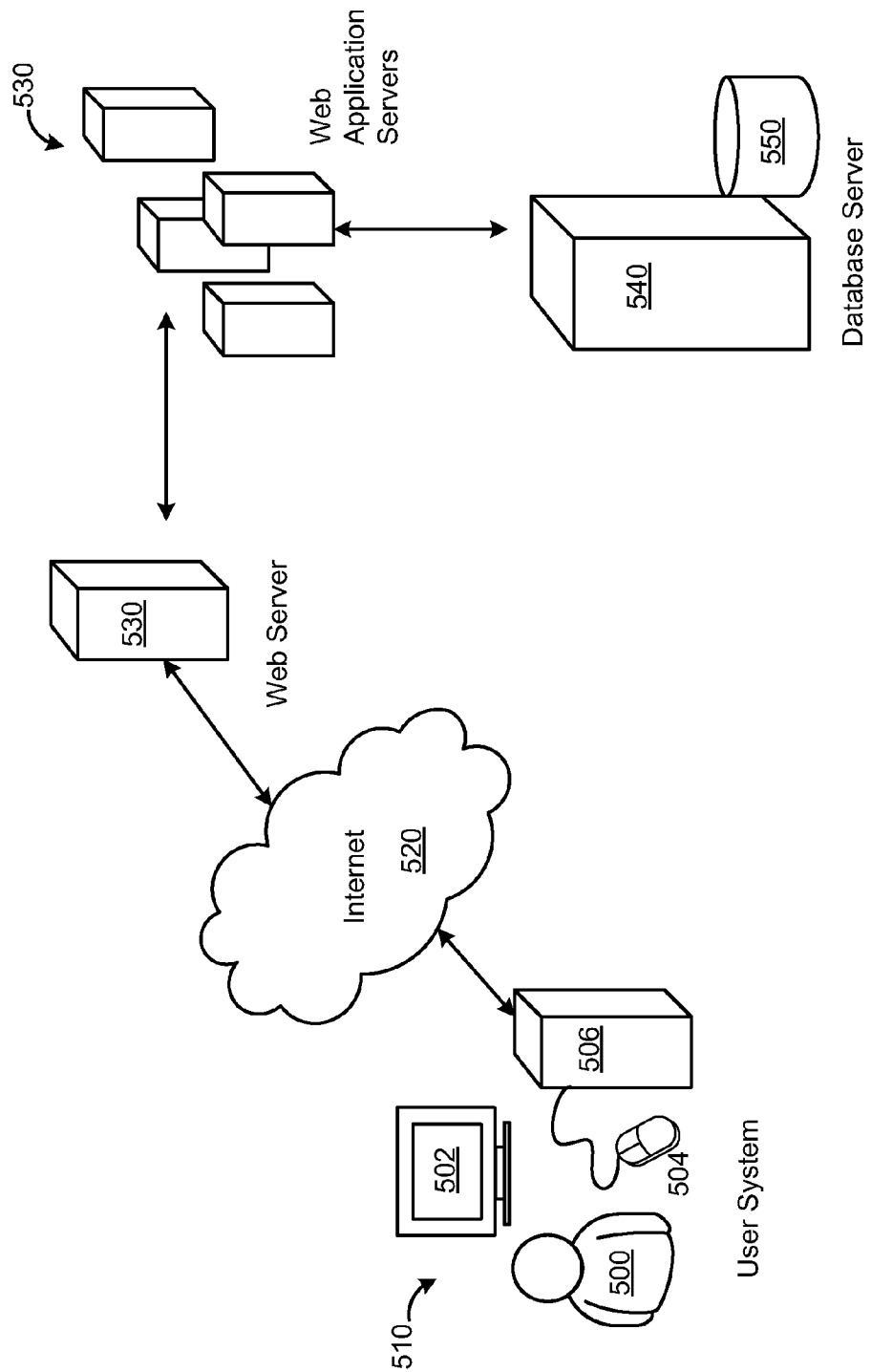
FIG. 8 provides a basic diagram of hardware that can be used to implement various features described herein.

FIG. 8 provides a basic diagram of hardware that can be used to implement various features described herein. The diagram of FIG. 8 is symbolic and merely representative of the types of high-level hardware, software, subsystems or other components that might be used. The operation of the various components is well-known so only a basic description is provided herein.

In a particular embodiment, a graph display or other data visualization is provided as a web application. In general, web applications run largely on a computer system that is geographically remote from an end user. The end user's system executes a web browser which receives web page data for display and transmits control commands that are invoked by the user on the web page. In web applications, graphs can have tens of thousands, millions or more data items that are part of a visualization. The need to efficiently handle these large graphs via a web browser interface where web page requests and transfers of large amounts of data are desired to be kept low presents design and engineering challenges that are addressed by some of the features described herein.

Web applications require only a web browser on the client side, enabling the users to access the application from almost any computer. Some web applications require the use of a specific web browser and most require browser add-ins and browser languages such as JAVA. Data can be shared with many users in an organization regardless of location. Response time of a web application is dependent on the connection speed (For Internet: dial-up, DSL, Fiber Optics, etc.).

In FIG. 8, user system 510 is operated by user 500 and can include display screen 502, user input device 504 and computer system 506. Computer system 506 houses familiar subsystems such as a processor, memory, hard disk drive, solid state drive, network interface, graphics card, etc. The computer system and associated components can be in many different shapes, sizes and configurations. For example, a laptop or all-in-one computer system can have the display, user input devices and computer system and subsystems all in one enclosure. Other arrangements are possible.

In a web application, user 500 accesses a software program over Internet 520. Signals generated by a user input device can be responded to by user computer 506 in whole or in part and can also be communicated to the Internet or other network. Such communication can be by wireless, wired, optical fiber, etc. In general, many variations are possible from the discussion of the specific example provided here in association with FIG. 8.

Web server 530 receives signals from user system 502 and manages various requests and information in exchanges with the user system. Some of the requests require the web server to communicate with one or more web application servers 530. Web application servers 530 may access database server 540 which, in turn, may external database 550. For example, web application software may execute for the most part on web application servers 530. The web application software can respond to a user-generated request to zoom in, or magnify, a portion of a graph being displayed on the user's display screen 502.

To properly generate the display and provide more details for the enlarged nodes, web application software may send a command to fetch information from database server 540 which may obtain data from external database 550. Web application software executing on web application servers 530 may render the updated display in a browser-compatible format such as an HTML 5 web page and provide the page information to web server 530 which sends the page information to the user's computer via Internet 520. The user computer system 506 executes a web browser which interprets the web page information and renders a display of the magnified graph.

Note that other embodiments may have different parts of the system performing different tasks. For example, the web page information may be generated by web server 530 and then transferred to the user computer system for display by a web browser. Or in non-web based applications the graph data, itself, may be sent in whole or in part to a program executing on user system 506. Many variations are possible. In general, any one or more processors in the system may perform all or part of a task, as desired, and depending upon the overall system implementation.

Components may be added to, removed or modified from those shown in FIG. 8. For example, in other embodiments the web server function may be performed by a web application server. Depending on how data is stored or needed, a database server system may not be required. Other variations are possible.

Although the description has been described with respect to particular embodiments thereof, these particular embodiments are merely illustrative, and not restrictive. For example, the layout methods described herein may be adaptable to any application that uses graphs to represent data. This includes, among others, semantic web applications, GIS applications, applications for managing cell-phone tower networks, and so forth. In general, any application or system that presents or visualizes a graph database may use any one or more features described herein.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for analyzing operations performed on a node-edge graph over time, the method comprising:
    displaying the node-edge graph;
    displaying a timeline;
    obtaining data indicating multiple operations made to the node-edge graph, wherein the data further includes corresponding timestamps at which each operation occurred;
    showing one or more of the operations on the timeline at the time indicated by the corresponding timestamps;
    accepting a signal from a user input device to allow a user to position a playhead indicator at a particular time on the timeline;
    determining which operations have timestamps that are within a predetermined interval of the playhead indicator's particular time position; and
    illustrating the determined operations in the display of the node-edge graph.

2. The method of claim 1, further comprising:
    accepting a signal from a user input device to allow a user to move the playhead indicator along the timeline; and
    updating the display of the node-edge graph in response to the moving of the playhead indicator to illustrate the determined operations in the display of the node-edge graph.

3. The method of claim 1, wherein the data further includes an actor that performed an operation.

4. The method of claim 3, further comprising:
    displaying an actor icon in the display of the node-edge graph corresponding with an actor that caused a determined operation.

5. The method of claim 4, further comprising:
    displaying a connector between the actor icon and an object that was changed due to a determined change event.

6. The method of claim 5, wherein an actor includes a person.

7. The method of claim 5, wherein an object includes a node.

8. The method of claim 5, wherein an object includes a position.

9. The method of claim 5, wherein the actor icon moves on or near the displayed node-edge graph.

10. The method of claim 5, wherein the actor icon is labeled with a person's name.

11. The method of claim 1, wherein the node-edge graph includes nodes and edges, wherein an operation includes an operation type of adding a node or removing a node, the method further comprising:
    providing a visual cue to differentiate an operation type of adding a node from an operation type of removing a node.

12. The method of claim 11, further comprising:
    using different colors on the timeline to indicate different operation types.

13. The method of claim 12, further comprising:
    using a matching color in the node-edge graph display to display a connector from an actor icon corresponding to an actor that performed an operation type that is shown on the timeline.

14. The method of claim 12, further comprising:
    using a red color to indicate the operation type of deleting a node; and
    using a green color to indicate the operation type of adding a node.

15. An apparatus for analyzing operations performed on a node-edge graph over time, the apparatus comprising:
    one or more processors;
    one or more processor-readable tangible media including instructions executable by the one or more processors for:
    displaying the node-edge graph;
    displaying a timeline;
    obtaining data indicating multiple operations made to the node-edge graph, wherein the data further includes corresponding timestamps at which each operation occurred;
    showing one or more of the operations on the timeline at the time indicated by the corresponding timestamps;
    accepting a signal from a user input device to allow a user to position a playhead indicator at a particular time on the timeline;

determining which operations have timestamps that are within a predetermined interval of the playhead indicator's particular time position; and illustrating the determined operations in the display of the node-edge graph.

16. The apparatus of claim 15, further comprising:

accepting a signal from a user input device to allow a user to move the playhead indicator along the timeline; and updating the display of the node-edge graph in response to the moving of the playhead indicator to illustrate the determined operations in the display of the node-edge graph.

17. The apparatus of claim 15, wherein the data further includes an actor that performed an operation.

18. The apparatus of claim 17, further comprising:

displaying an actor icon in the display of the node-edge graph corresponding with an actor that caused a determined operation.

19. The apparatus of claim 18, further comprising:

displaying a connector between the actor icon and an object that was changed due to a determined event.

20. A processor-readable non-transitory media including instructions executable by one or more processors for analyzing operations performed on a node-edge graph over time, the processor-readable tangible media including instructions for:

displaying the node-edge graph;

displaying a timeline;

obtaining data indicating multiple operations made to the node-edge graph, wherein the data further includes corresponding timestamps at which each operation occurred;

showing one or more of the operations on the timeline at the time indicated by the corresponding timestamps;

accepting a signal from a user input device to allow a user to position a playhead indicator at a particular time on the timeline;

determining which operations have timestamps that are within a predetermined interval of the playhead indicator's particular time position; and illustrating the determined operations in the display of the node-edge graph.

* * * * *

UNITED STATES PATENT AND TRADEMARK OFFICE
CERTIFICATE OF CORRECTION

| | | |
|---|---|---|
| PATENT NO. | : 9,146,657 B2 | Page 1 of 1 |
| APPLICATION NO. | : 14/033327 | |
| DATED | : September 29, 2015 | |
| INVENTOR(S) | : Beckett et al. | |

It is certified that error appears in the above-identified patent and that said Letters Patent is hereby corrected as shown below:

In the specification

Column 1, line 6-11, delete "This application is related to U.S. Patent Application Serial No. [TBD], entitled "COMPUTER USER INTERFACE INCLUDING LENS-BASED NAVIGATION OF GRAPHS," filed on Sep. 19, 2013, which is hereby incorporated by reference, as if it is set forth in full in this document for all purposes" and insert -- This application is related to the following application, U.S. Patent Application Serial No. 14/033,327, entitled COMPUTER USER INTERFACE INCLUDING LENS-BASED NAVIGATION OF GRAPHS, filed on Sep. 19, 2013, which is hereby incorporated by reference, as if it is set forth in full in this specification. --, therefor.

In the claims

Column 11, line 21, claim 19, after "determined" insert -- change --.

Signed and Sealed this
Seventh Day of June, 2016

Michelle K. Lee
*Director of the United States Patent and Trademark Office*